United States Patent [19]
Feher

[11] Patent Number: 5,117,638
[45] Date of Patent: Jun. 2, 1992

[54] SELECTIVELY COOLED OR HEATED SEAT CONSTRUCTION AND APPARATUS FOR PROVIDING TEMPERATURE CONDITIONED FLUID AND METHOD THEREFOR

[76] Inventor: Steve Feher, 1909 Aleo Pl., Honolulu, Hi. 96822

[21] Appl. No.: 664,381

[22] Filed: Mar. 14, 1991

[51] Int. Cl.⁵ .............................................. F25B 21/02
[52] U.S. Cl. ..................................... 62/3.2; 165/183; 165/104.21
[58] Field of Search ................... 62/3.61, 261, 3.1, 3.2, 62/3.3; 165/183, 184, 104.21; 98/203, DIG. 11

[56] References Cited
U.S. PATENT DOCUMENTS 3,834,171 9/1974 Johansson ............................. 62/3.3

Primary Examiner—Albert J. Makay
Assistant Examiner—John Sollecito
Attorney, Agent, or Firm—George J. Netter

[57] ABSTRACT

A selectively cooled or heated seat has an outer layer (40) of corduroy appearance with perforations (46) between wales through which conditioned air can flow. Alternatively, layers (47,52) are constructed of molded plastic or rubber. The seat construction is made by molding a cushion (64) of foam over the seat outer layer. The conditioning apparatus has a unitary fin structure (74) or, alternatively, a heat pipe (82) for removing or adding heat to the thermoelectric auxiliary heat exchanger (20). In a further modification, heat exchanging coils (34) located within the seat (24) have a fluid circulating through them and the conditioning apparatus auxiliary heat exchanger with ambient air being blown across the coils.

4 Claims, 4 Drawing Sheets

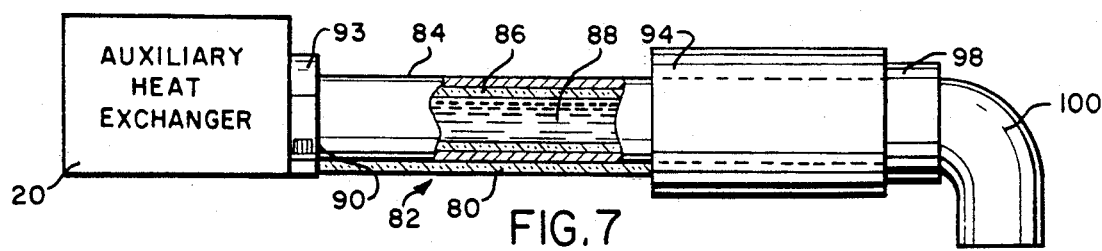
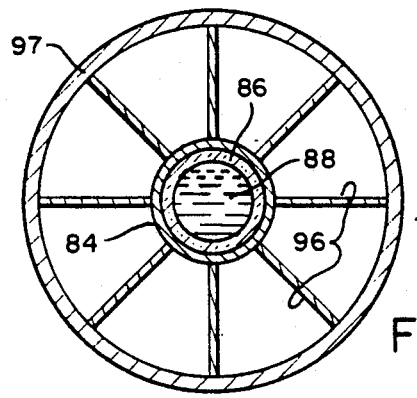
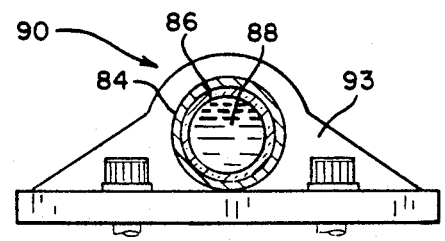
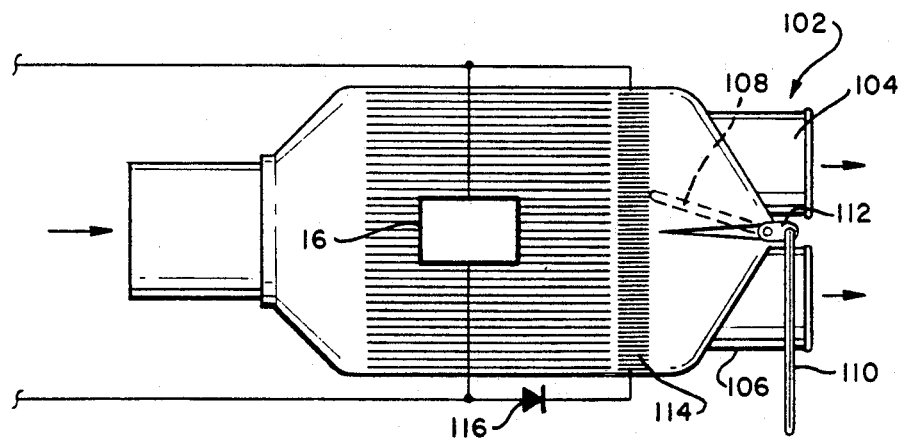
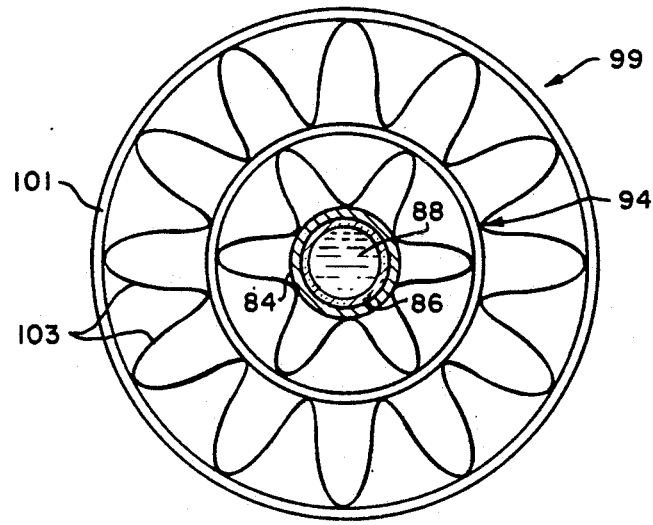

SELECTIVELY COOLED OR HEATED SEAT CONSTRUCTION AND APPARATUS FOR PROVIDING TEMPERATURE CONDITIONED FLUID AND METHOD THEREFOR

BACKGROUND OF THE INVENTION

1. Field of the Invention

The present invention relates generally to a seat construction which can be selectively heated or cooled and apparatus for providing temperature conditioned fluid to the seat construction, and, more particularly, to a seat construction of improved heat transfer characteristics and method of making, and fluid temperature conditioning apparatus with enhanced means for dissipating waste heat.

2. Description of Related Art

In U.S. Pat. No. 4,923,248, COOLING AND HEAT SEAT PAD CONSTRUCTION, by Steve Feher there is described a seat pad construction with air modification apparatus which selectively provides heated or cooled air to the seat pad interior. Both the backrest and seat portions of the seat pad construction are accordingly cooled or heated, as desired. The patented seat pad construction is contemplated for being located in or on an automobile seat, or on any other type of chair. The energy requirements are relatively small and since the temperature conditioning effect is localized, it does not affect others in the vicinity. The fluid modifying apparatus of this patent utilizes as the basic conditioning apparatus Peltier effect devices (i.e., operating on thermoelectric principles) which can be electrically energized to heat or cool air, or other fluid passing thereover.

Also, in U.S. patent application Ser. No. 423,008, SELECTIVELY COOLED OR HEATED SEAT AND BACKREST CONSTRUCTION, by Steve Feher, there is described a seat and backrest construction, the covering for the outer surface facing the user of which is multi-layered consisting of metal and/or plastic mesh layers combined with a perforated synthetic elastomer or natural rubber material layer which provides not only an overall surface through which convection cooling/heating can efficiently occur, but also a surface having a suitable heat mass so as to provide direct conduction of heat to or from the user, as the case may be. An internal plenum for both the seat and backrest parts is formed by either coil springs or flexible molded plastic tubes having perforated walls which at the same time act as a spring for supporting the user. In a further aspect of the invention of this application, condensate which collects in the conditioning unit is reduced by a felt pad forming a condensate trap and a felt strip or wick having one end in contact with the condensate trap and an opposite end located in the ambient airstream moves the condensate into the auxiliary heat exchanger airstream enhancing overall temperature conditioning apparatus performance.

SUMMARY OF THE INVENTION

In accordance with a first embodiment of the present invention, the outermost and heat exchanging surface of both the seat and the backrest includes an outer cover layer having strips of thickened material maintained in spaced apart relation forming an overall "corduroy" appearance with inter-wale portions provided with a plurality of perforations through which conditioned air can pass. This outer layer rests on a relatively thin open-cell foam layer under which are provided a metal mesh layer and an innermost plastic mesh layer as described in the referenced Feher patent and application. This combination outer cover layer for the plenum can cover both the top, bottom and sides of the seat and backrest although it is only necessary that the described outer cover layer cover those surfaces adjacent the back and lower legs of the user.

As an alternate version of the seat and backrest outer cover layer, a molded plastic or natural rubber layer of desired thickness is provided with a plurality of perforations passing completely through the material thickness. The molded layer can either be flat and of uniform thickness or can have other predetermined contours. Although not significantly affecting heat and temperature conditioned air from passing between the user and the molded layer, a single fabric diffusion layer may be extended over the molded layer and provided with an outer finish that may be more aesthetically and decoratively ornamented.

The first step of the method of making a seat construction of the first described embodiment is to arrange the outer cover layer within the cavity of a mold of proper dimensions and geometry for the finished seat. Next, the lower plenum wall and suitable tubing or conduits for the plenum conditioned air inlet and outlet of the seat central space are located at opposite sides of the cavity. Next, a cushion of foam plastic is poured and allowed to rise and cure forming the plenum support foam layer.

The apparatus for conditioning fluid to be applied to an internal plenum of the seat construction includes a thermoelectric device (e.g., Peltier device) which, dependent upon the direction of electric current passing therethrough, will either heat or cool one surface with respect to the temperature of an opposite surface. Fluid (e.g., air) passing over the main heat exchanger side provides the temperature modified fluid for the seat construction plenum. On the opposite side, which is termed the auxiliary side of the thermoelectric device, there is arranged an auxiliary heat exchanger constructed in a way to be described for enhancing overall operational efficiency. The auxiliary or secondary heat exchanger includes a one-piece housing which can be molded or extruded and has a top, bottom and two side walls with the space between open from an entrance end to an exit end via which ambient air passes.

Within the apparatus housing space there is provided a unitary fin structure formed by a single enlarged rectangular sheet of metal having a plurality of creases or folds (i.e., alternately folded in one direction and then the opposite). The folded fin arrangement has a plurality of air paths extending between the inlet and outlets of the housing along which air passes and heat exchange with the auxiliary side of the thermoelectric device is achieved.

In accordance with another version, the auxiliary side of the fluid conditioning apparatus includes a heat pipe having one end secured to the TE unit auxiliary heat exchange in good heat conducting relation and the opposite end is located remotely in the ambient air. When the TE unit is operated to cool, by a combination of vaporization and condensation heat is transferred from the TE unit to the pipe outer end where outer fins and a blower act to further transfer the heat to ambient air. When the TE unit is operated in the heating mode heat from the ambient air transfers to the heat pipe outer end and moves along the heat pipe in reverse direction to the TE unit.

In accordance with yet another embodiment of the invention, the auxiliary heat exchanger has a hollow coil located in the seat backrest through which a liquid (e.g., water/glycol mixture) is pumped moving heat to (or from) the auxiliary heat exchanger. Ambient air within the backrest is blown over the coils prior to being emitted from outlet openings in the top edge surface of the backrest into the surrounding air. The liquid within the coils is then circulated back to the TE auxiliary heat exchanger by a circulating pump, either cooling or heating the same depending upon mode of operation.

DESCRIPTION OF THE DRAWING

In the accompanying drawing:

FIG. 7 is a side elevational view of the described air conditioning apparatus showing those parts handling the auxiliary exchanger efflux;

FIG. 8 is an elevational sectional view through a further heat exchanger for the heat pipe of FIG. 7;

FIG. 9 is a sectional view through the connection of the heat pipe with the main heat exchanger;

FIG. 10 is a top plan partially schematic view of the main heat exchanger modified to include an afterheater; and FIG. 11 is another embodiment of a heat exchanger for the end of the heat pipe of FIG. 7.

DESCRIPTION OF PREFERRED EMBODIMENTS

Figure 1:
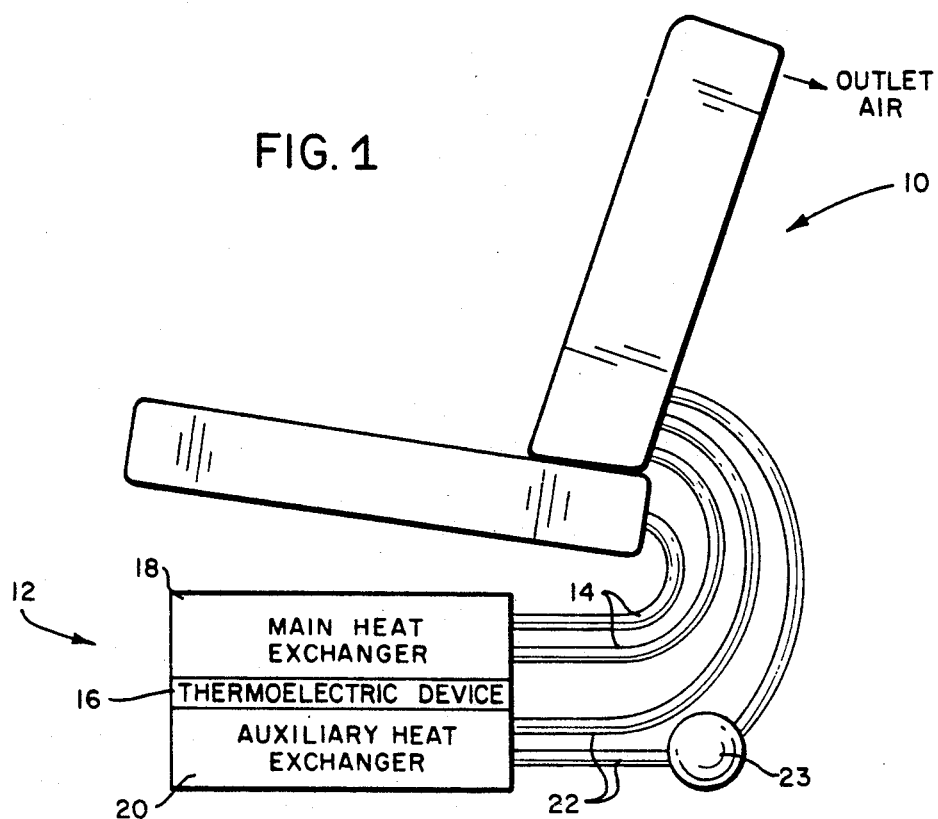
FIG. 1 is a side elevational view of seat and backrest construction with fluid temperature conditioning apparatus of this invention.

With reference now to the drawings and particularly FIG. 1, a seat and backrest 10 is shown of the kind described in U.S. Pat. No. 4,923,248 having internal plena provided with heated or cooled air, as desired, from a fluid temperature conditioning apparatus 12 via a set of hoses or conduits 14.

More particularly, the conditioning apparatus 12 is of a thermoelectric category (e.g., Peltier) including generally a thermoelectric device 16 (TE) that, depending upon the direction of energizing electrical current, will selectively cool or heat air passing through the main heat exchanger 18 and along the conduits 14 to the seat and backrest.

In a cooling mode, an auxiliary heat exchanger 20 located on the opposite side of the thermoelectric device 16 from the main heat exchanger serves to transfer heat produced and absorbed by the TE device to the ambient environment. In one of the embodiments to be described, the auxiliary exchanger is cooled (when TE is operated in cooling mode) by a liquid circulated through coils located within the seat backrest and a blower moves the heat from the coils 22 and fluid contained therein to the ambient air. Specifically, fluid (e.g., liquid) circulates through coils 22 arranged in a closed path in the back of the seat and return to the auxiliary heat exchanger 20. As will be described, a pump 23 circulates fluid via the coils 22 enhancing efficiency in removing heat from (or adding heat to) the auxiliary exchanger.

Figure 2:
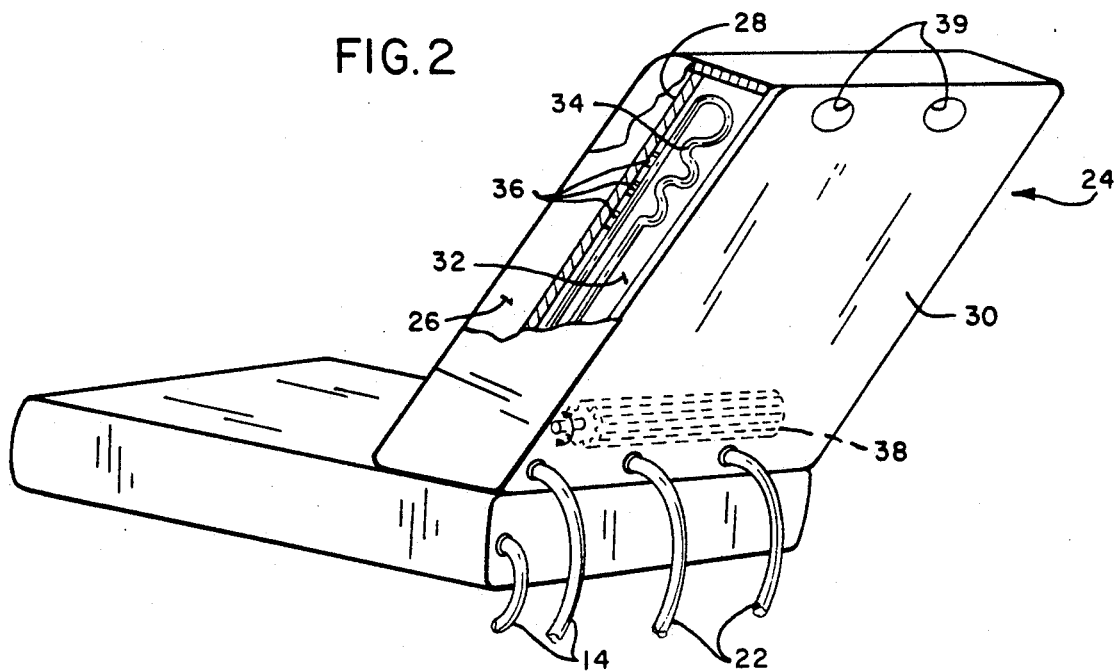
FIG. 2 is a perspective, partially fragmentary view of the apparatus of FIG. 1.

Turning now to FIG. 2, it is seen that the backrest 24 includes a plenum 26 through which conditioned air passes that is defined at the rear by a relatively imperforate wall 28, the outside of which may be covered over with a fabric, leather or other eye-pleasing material 30, enclosing a space 32. Within the space 32 there is located a set of heat exchanger coils 34 secured to the outer surface of the wall 28 and preferably slightly spaced therefrom by brackets 36. At the lower end of the backrest within the same space 32 there is positioned a blower 38, such as a tangential blower, for example, for moving air upwardly through the space 32 and across the heat exchange coils 34 to absorb heat from the coils (and thus from the enclosed fluid). The auxiliary exchanger outlet air then exits via openings 39 in the top of the backrest into the environment.

In this way, the fluid (e.g., glycol/water mixture) which is passed along the hoses 22 circulates on a closed path through and across the heat exchange surfaces within the auxiliary heat exchanger 20, and outwardly where heat is exhausted or added to the circulating fluid, as the case may be. By providing the special treatment of the outlet heat overall operational efficiency of the thermoelectric device 16 is improved and system installation is made easier where space is at a premium.

Figure 3A:
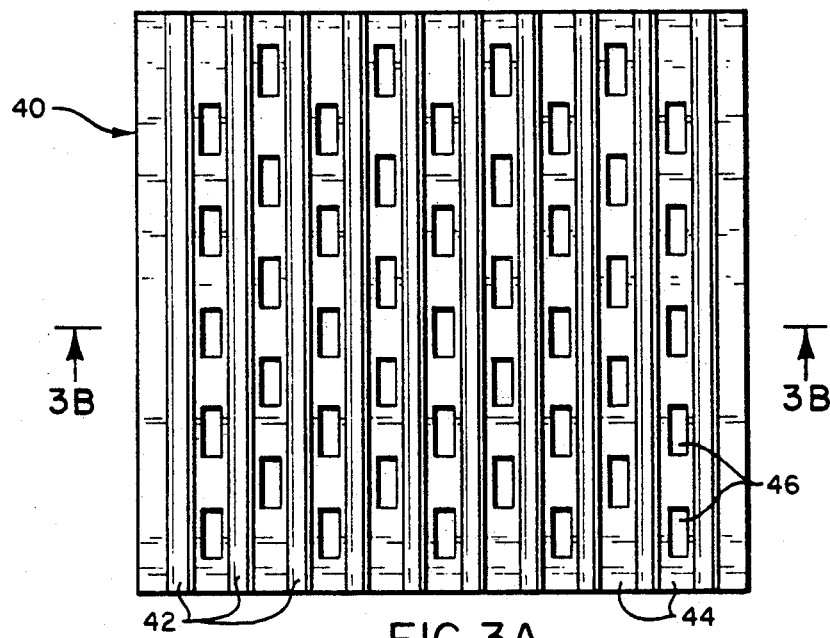
FIGS. 3A and 3B depict top plan and side elevational, sectional views of a first version of outer covering.

FIG. 3A shows a plan view of an outer covering 40 which is especially advantageous for covering either a seat or backrest to be cooled or heated by the provision of conditioned air to internal plena in the manner of the present invention. The covering includes a plurality of spaced apart wales 42 (upstanding ridges of material) separated by relatively thin fabric or material strips 44. The latter also include a plurality of perforations 46 extending completely through the material enabling the conditioned air added to the internal plena to absorb heat by convection from the user in the cooling mode and transfer to the user in the heating mode. By this construction, even with a relatively heavy individual sitting on the seat, or leaning against the backrest, this does not result in a closing off in a total manner of a large number of the openings, which occurs in certain other outer surface coverings and which if it happened would result in reduced efficiency.

In addition, underlying special covering layer 40 there can be provided the multiple layer arrangement consisting of at least one plastic mesh layer and a layer of metal mesh, such as descried in the referenced U.S. Pat. No. 4,923,248.

Figure 4A:
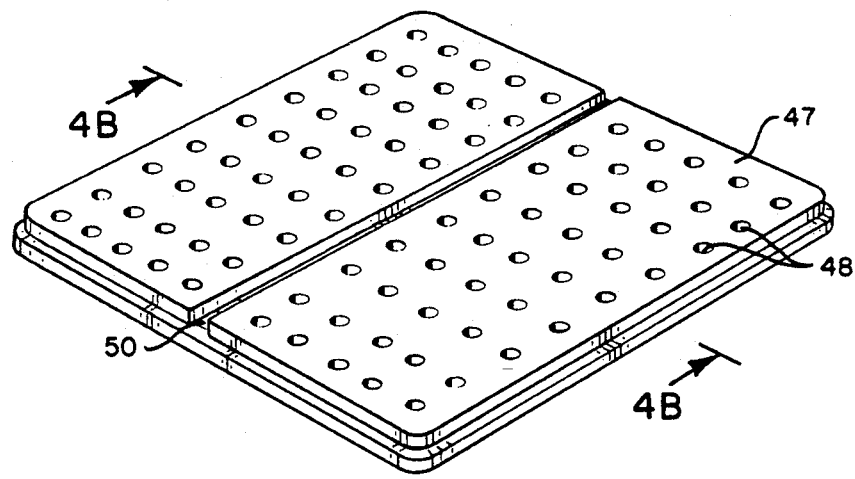
FIGS. 4A-4C show two different versions of molded outer covers.
Figure 4B:
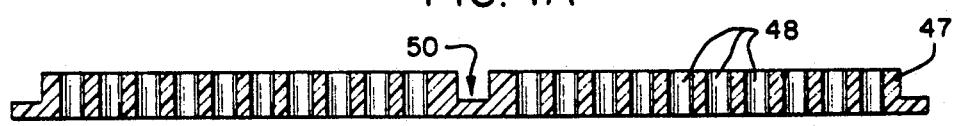
Figure 4C:
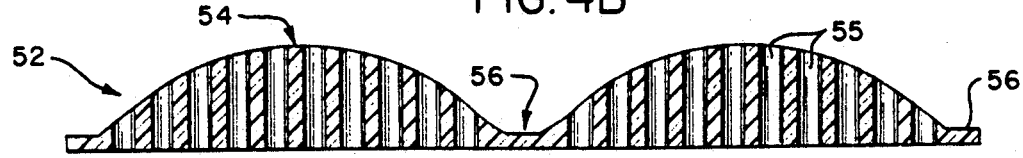

FIGS. 4A, 4B and 4C depict two different alternative versions of an outer layer for a seat or backrest, both of which are constructed of molded plastic or rubber and offer the advantages of providing efficient convection cooling or heating while enabling the seat and/or backrest to be sculpted instead of merely a plain flat surface. This is an important aesthetic consideration for automotive interior designers, in particular.

In FIGS. 4A and 4B, the layer 47 is a flat sheetlike member with substantially parallel opposite major surfaces and includes a plurality of perforations 48 in a generally uniform arrangement. At least one premolded groove 50 can be applied at any convenient place enabling outer cover material to be sewn down into the groove/s producing a pleat. Without the groove it is virtually impossible to sew the elastomer down far enough to produce a pleated or tufted seat surface.

FIG. 4C depicts another molded layer modification 52 in which a predetermined contour is achieved consisting of raised portions 54 with perforations 55 in between the raised portions flattened edges or groove-like parts 56, for example. The raised portions 54 on their outer surface may be elongated and convexly curved transversely of the longitudinal axis.

In both the construction of FIGS. 4A–4C, air from the internal seat or backrest plena, as the case may be, passes readily through the perforations to warm (or cool) the user. Also, the outer surface may be configured to achieve any desired ornamentation or may be covered with a further thin fabric which has a high diffusivity with respect to air so as not to impede air transfer.

Figure 3B:
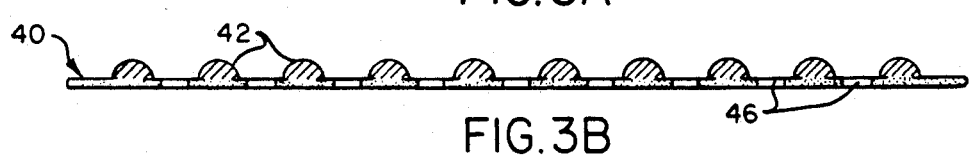
Figure 5A:
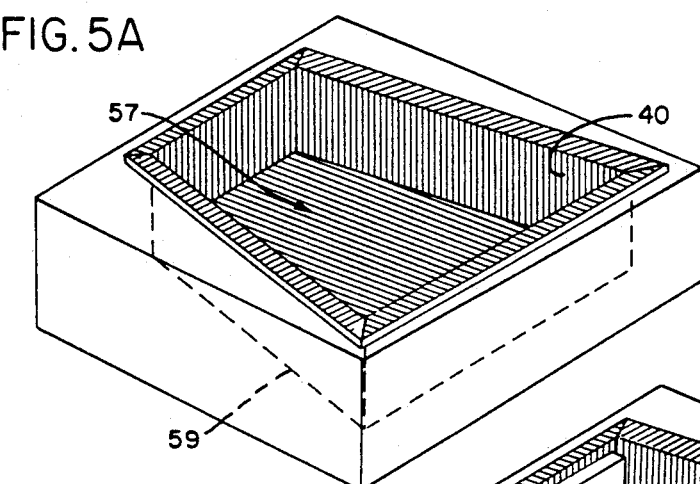
FIGS. 5A, 5B and 5C show the steps in molding a seat including an outer covering of the present invention.
Figure 5B:
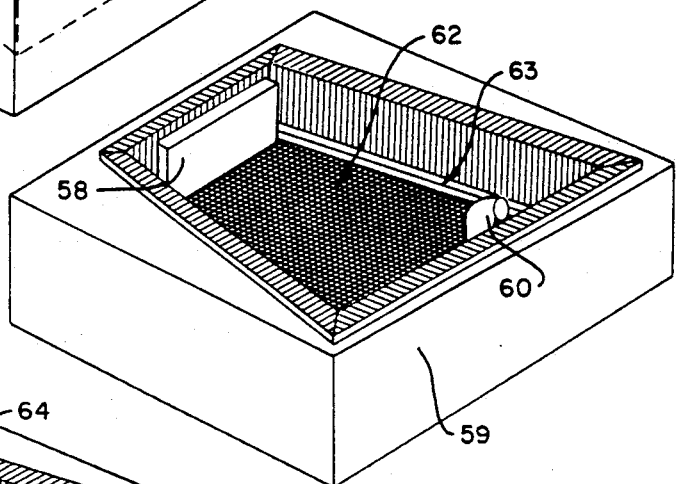
Figure 5C:
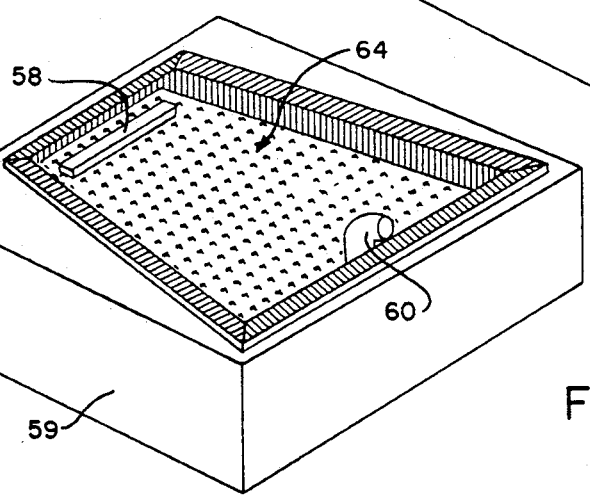

For certain kinds of automobile seats, it may be especially advantageous to be able to preferably mold them in as few steps as is possible for cost effectiveness. With reference now to FIGS. 5A, B and C, a method is depicted for accomplishing the production of a seat which can serve as an automobile seat in its normal function, will include an enclosed plenum for receiving pressurized conditioned air, and will have as its outer layer the outer covering 40 of FIG. 3. As a first step, a mold 59 having the proper cavity 57 for the seat is lined on the cavity sides and bottom with the air-permeable outer covering 40 (FIG. 5A). Next, a plenum air outlet vent 58 and air inlet nozzle 60 are located within the cavity at opposite sides with parts thereof extending to the uppermost reaches of the mold cavity and thus to the eventual seat bottom (FIG. 5B). The plenum 62, which generally includes a bottom wall and side walls within which coil or tubular springs are located as described in the referenced Feher patent, is located within the mold cavity resting on the outer covering 40 and interconnected with the inlet nozzle 60 and outlet vent 58. Next, a tape seal 63 (FIG. 5B) is applied around the plenum periphery to prevent leakage around the plenum/covering interface edge. Foam 64 is then poured into the remaining cavity, allowed to rise to the proper level, and finally cured (FIG. 5C).

Figure 6:
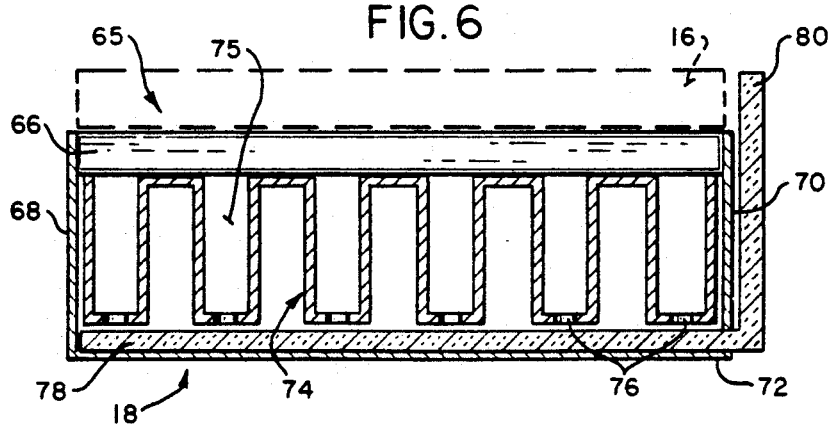
FIG. 6 is an end elevational, sectional view of the air temperature conditioning apparatus of the invention.

For the ensuing description of the fluid temperature conditioning apparatus 12, reference is now made to FIG. 6 where the main heat exchanger 18 is shown with its interior exposed. In its major parts, the main exchanger housing 65 includes a heat exchanger base plate 66 that is maintained in good contact with the thermoelectric device 16 via which heat is transferred, the direction of transfer depending upon whether the apparatus is energized to cool or heat the seat and backrest 10. The base plate is interconnected with two sidewalls 68 and 70 and a bottom wall 72. A unitary set of folded fins 74 is received within the main heat exchanger housing and, in a way more particularly described in the referenced U.S. patent, a blower (not shown) passes air along the internal parts of the heat exchanger, along channels 75 defined by the folded fins 74 and outwardly through the hose conduits 14 to cool or heat the seat and backrest. Moreover, the unitary folded fins 74 are fabricated by beginning with an initially rectangular flat sheet of material (e.g., thin metal) which is then folded a plurality of different times along spaced apart, parallel fold lines to form the composite arrangement shown. In addition, where each fin folds and on the same side of the set (namely, the side opposite the base plate) there are formed a plurality of drain openings 76. The entire fin assembly is positioned slightly above a sheet of a felt-like material 78 which absorbs condensate produced during use of the apparatus that passes through the openings 76.

Furthermore, a part of the condensate trap 78 in strip form 80 extending outwardly from the housing 65 of the main heat exchanger serves as a wick to conduct condensate from the main heat exchanger to the exterior or, alternatively, to the auxiliary heat exchanger where ambient air is blown across it by a blower, for example. In either way, the condensate evaporates into the ambient air and collection of undesirable amounts of condensate within the housing and on other exchanger parts is thereby avoided.

It is a further aspect of the invention to provide an alternative means 82 for transferring heat between the auxiliary heat exchanger and the ambient environment. The means 82 as shown best in FIG. 7 includes a so-called "heat pipe" 84 which transfers heat either away from or to the auxiliary heat exchanger 20 along a closed pipe by relying upon condensation and evaporation of a working fluid. More particularly, the heat pipe 84 is a hollow closed-end pipe constructed of a good heat conducting metal. The internal wall surface of the pipe is covered with a wick 86 and the working fluid is a volatile liquid 88. Briefly as to operation, heat applied at one end of the pipe 84 is absorbed by the liquid causing to vaporize and the vapor moves to the pipe opposite or cooler end. The vapor on condensing at the pipe cool end is returned to the pipe hot end via the wick 86 and so the process continues.

For a more detailed description of a heat pipe and theory of operation reference is made to the *Encyclopedia of Chemical Technology*, Volume 12, Third Edition, John Wiley & Sons, Inc. (1980).

One end 90 of the heat pipe is secured within an adapter 93 that is affixed to the auxiliary heat exchanger 20 (FIGS. 6 and 9). It is preferable that the adapter and the means for securing the adapter and heat pipe to the auxiliary heat exchanger be such as to insure optimally good heat conducting relationship between the various parts. For example, the parts may be brazed together at their respective interfaces.

At the outer end 92 of the heat pipe 84 remote from the auxiliary heat exchanger there is located in surrounding relationship to the pipe a further heat exchanger 94 consisting of a plurality of radially extending fins 96 in good heat conducting relation with the outer surface of the pipe 84 and which is enclosed within a hollow cylindrical housing 97 (FIG. 8). A blower 98 passes environmental air across the fins 96 and outwardly of a fixture 100 which can be adjustably directed in any desired direction. By these means heat transferred from the auxiliary heat exchanger is moved from the cold end of the heat pipe into the ambient environment.

FIG. 11 depicts a modified form of heat exchanger 99 for use in place of the heat exchanger 94 in FIG. 8. Specifically, the exchanger 94 is enclosed within a further cylindrical shroud 101 having radially extending fins 103 interconnecting shrouds 92 and 101. By this construction air from the blower 98 transfers heat from (or to) two sets of fins rather than one which thereby increases efficiency of operation.

As can be best seen in FIG. 7, the main heat exchanger condensate wick 80 can be adhered, or otherwise secured, to the outer surface of the heat pipe 84 with the wick outer end being located adjacent to the blower 98 which will aid in eliminating condensate.

Turning to FIG. 10, it is seen that the conditioned air outlet 102 from the main heat exchanger 18 is formed into two channels 104 and 106 respectively interconnected with the conduits 14 for individually supplying conditioned air to the seat and backrest. A proportioning flap valve 108 has a lever arm 110 that is manually adjustable to control the ratio of conditioned air provided to the seat and backrest. More particularly, the lever arm 110 has one end rotatably connected to the outer end of a further lever arm 112, the other end of the latter being fixed to the flap valve pivot (not shown). By use of this two lever valve actuation technique, lever arm 110 does not require the space involved in a strictly rotating adjustment arm, and the undesirability of over-center lockup or adjustment difficulty is avoided.

When the described apparatus is being utilized in the heating mode during relatively cold weather (e.g., 10° F. or lower), the rapidity of effective heating of the entire apparatus can be considerably enhanced by the addition of an after heater 114 located between the valve 108 and the TE device 16 within the apparatus. As shown, the afterheater 114 is electrically in parallel with the TE device 16 so that the two are energized at the same time when the mode switch 114 is set to "heating" mode. A diode 116 in the energization circuit for the afterheater prevents operation during the "cooling" mode. The afterheater may consist of any of a number of commercially available resistance heaters (e.g., PTC ceramic).

Although the invention is described in connection with preferred embodiments, it is to be understood that modifications will occur to those skilled in the appertaining arts that are within the spirit of the described invention and the ambit of the appended claims.

What is claimed is:

1. Air temperature conditioning apparatus having a thermoelectric device, a main heat exchanger for providing heated or cooled air depending upon the direction of energizing current through the device, and an auxiliary heat exchanger, comprising:
   a metal pipe having closed ends, a volatile liquid contained therein and an absorbent material lining the pipe interior, one end of said pipe being in good thermal contact with the auxiliary heat exchanger and the pipe opposite end being located in the ambient air;
   a set of radially extending fins mounted onto the pipe opposite end; and
   a blower directing a pressurized stream of ambient air across the fins aiding transfer of heat between the fins and ambient air, said blower being mounted on the metal pipe and adjustable to direct the pressurized stream of ambient air over a predetermined angular range.

2. Air temperature conditioning apparatus as in claim 1, in which the set of fins is located within an open-ended cylindrical shroud and the blower passes environmental air generally parallel to the shroud cylindrical axis.

3. Air temperature conditioning apparatus as in claim 1, in which there is further provided a conditioned air outlet interconnected with the main heat exchanger having two channels for directing conditioned air to the seat and backrest, respectively, and a manually adjustable flap valve for proportioning conditioned air between the two channels.

4. Air temperature conditioning apparatus as in claim 3, in which the flap valve includes a pivot for rotating the valve throughout its range of adjustment, a first lever arm having an end portion affixed to the pivot, and a second lever arm having an end portion rotatably secured to the first lever arm other end portion.

* * * * *